(12) United States Patent
George et al.

(10) Patent No.: US 6,706,399 B1
(45) Date of Patent: Mar. 16, 2004

(54) NON-BLOCKING POLYMERIC ARTICLES

(75) Inventors: Scott Ellery George, Kingsport, TN (US); Coralie McKenna Fleenor, Rogersville, TN (US); David T. Bowers, Kingsport, TN (US); Richard Anthony Miller, Kingsport, TN (US); Ricky Thompson, Piney Flats, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/649,833

(22) Filed: Aug. 29, 2000

(51) Int. Cl.$^7$ .................. B32B 27/08; B32B 27/36
(52) U.S. Cl. ............... 428/407; 525/425; 525/439; 525/444; 525/462
(58) Field of Search ................ 428/407; 525/444

(56) References Cited

U.S. PATENT DOCUMENTS

| | | | |
|---|---|---|---|
| 2,465,319 A | 3/1949 | Whinfield et al. ............ 260/75 |
| 2,595,679 A | 5/1952 | Lew et al. | |
| 3,014,011 A | 12/1961 | Zoetbrood et al. | |
| 3,377,320 A | 4/1968 | Zoetbrood ................ 260/75 |
| 3,723,035 A | 3/1973 | Franke ................. 425/71 |
| 4,576,835 A | 3/1986 | Gardenier ............... 427/222 |
| 4,645,537 A | 2/1987 | Gardenier et al. .......... 106/243 |
| 4,774,138 A | 9/1988 | Gardenier et al. .......... 428/407 |
| 5,057,571 A | 10/1991 | Malcolm et al. ........... 524/505 |
| 5,207,967 A | 5/1993 | Small, Jr. et al. ....... 264/328.16 |
| 5,257,491 A | 11/1993 | Rouyer et al. ............. 53/428 |
| 5,322,731 A | 6/1994 | Callahan, Jr. et al. ...... 428/327 |
| 5,446,079 A | 8/1995 | Buchanan et al. ........... 524/41 |
| 5,500,261 A * | 3/1996 | Takei ................. 428/35.7 |
| 5,539,078 A | 7/1996 | Burkett et al. ............. 528/277 |
| 5,540,868 A | 7/1996 | Stouffer et al. | |
| 5,580,911 A | 12/1996 | Buchanan et al. ........... 524/41 |
| 5,599,858 A | 2/1997 | Buchanan et al. ........... 524/41 |
| 5,695,710 A | 12/1997 | Chen, Sr. et al. .......... 564/532 |
| 5,733,645 A | 3/1998 | Somers ................ 428/219 |
| 5,750,605 A | 5/1998 | Blumenthal et al. ........ 524/230 |
| RE36,177 E | 4/1999 | Rouyer et al. ............ 53/428 |
| 5,942,304 A | 8/1999 | Somers ................ 428/68 |

FOREIGN PATENT DOCUMENTS

| | | | | |
|---|---|---|---|---|
| DE | 2248046 | 9/1972 | | |
| EP | 0 115 307 B1 | 1/1984 | ............. | C09J/3/00 |
| EP | 0 115 307 A2 | 1/1984 | ............. | C09J/3/00 |
| EP | 0 410 914 A1 | 7/1990 | ............. | B29B/9/06 |
| WO | WO 96/00747 | 1/1996 | ............. | C08J/3/12 |
| WO | WO 99/18147 | 4/1999 | ............. | C08J/3/12 |

OTHER PUBLICATIONS

PCT/US01/26272 International Search Report, mailed Mar. 18, 2002.

* cited by examiner

*Primary Examiner*—Patricia A. Short
(74) *Attorney, Agent, or Firm*—Polly C. Owen; Bernard J. Graves, Jr.

(57) ABSTRACT

The present invention provides an article of manufacture having a coating or is otherwise surrounded in large measure by a second polymer which has non-blocking characteristics. In a preferred embodiment, the article possesses a core polymer which has a $T_g$ of less than 25° C. which is coated with or otherwise surrounded by a second polymer which has a $T_g$ of greater than 25° C., but less than 230° C. Further, preferred core polymers have a number average molecular weight of about 3000 to about 100,000. A further feature of the articles of the present invention is that when heated to temperatures of about 100 to 300° C., they undergo an ester exchange reaction to provide a substantially homogeneous polymer product useful in hot melt adhesive applications.

47 Claims, No Drawings

NON-BLOCKING POLYMERIC ARTICLES

FIELD OF THE INVENTION

This invention relates to polyester articles. More specifically, the present invention is directed to non-blocking polyester articles.

BACKGROUND OF THE INVENTION

Polyesters are synthesized from a variety of reactant combinations and process conditions. In most cases, a generic repeating unit is obtained having a main-chain structure of:

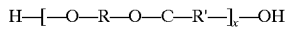

wherein R and R' may or may not be different and are generally straight, branched, and cyclic aliphatic and aromatic groups. Typical industrial processes are based on the reaction of at least one diol with at least one diacid or diester to yield the linear polymer structure shown supra. It is well known that alcohols, acids (esters) or both alcohols and acids having more than 2 functional groups may be used to produce branched polyesters. The chemical structure of the monomers will determine the physical properties of the resulting polymer.

One key property relating to the present invention is the glass transition ($T_g$) temperature, which is sometimes referred to as the softening point. At temperatures below the $T_g$ a polymer is hard and glassy, while temperatures above the $T_g$ result in a change to a soft and rubbery or sticky material. In the absence of crystallinity, the polymer may be considered a solid below the $T_g$ and as a liquid above the $T_g$. Therefore, when the $T_g$ of an amorphous polymer is at or below ambient temperature the polymer behaves as a liquid that will undergo viscous flow. When separate quantities of a "liquid" polymer are placed next to each other they will tend to stick together and eventually the viscous flow may result in the formation of a single mass. Convenient product forms, such as pellets or pastilles, are normally encountered for substantially amorphous polymers only when the $T_g$ is not significantly lower than the ambient temperature. From a product-packaging viewpoint, ambient temperature can be defined as a nominal room temperature of 25° C. to a more climatic extreme of 50° C.

Polyesters having low molecular weights, i.e., less than about 5,000, are used extensively in the coatings (alkyds) and thermosetting moulding (unsaturated polyesters) industries. Both of these application areas involve curing or crosslinking of the resin to form a non-tacky film or object. Before curing, the product containing the polyester is most conveniently handled in the bulk form or in a liquid vehicle. Therefore, a low $T_g$ polyester of this type normally does not need to be packaged in the neat form as discrete partides in order to provide an easily handled product.

Polyesters having high molecular weights, i.e., greater than about 10,000 are used in film, fiber, packaging, and moulding or engineering materials applications. Most common are poly(ethylene terephthalate) (PET), poly(butylene terephthalate) (PBT), terephthalate copolyesters containing 1,4-cyclohexanedimethanol (CHDM), and polyester thermoplastic elastomers. These products have appreciable amounts of crystallinity and/or glass transition temperatures above the ambient range, which allows them to be packaged as free-flowing pellets. Some specialty polyesters containing at least some of the monomers listed above and other acids and diols, such as isophthalic acid and diethylene glycol, are commercially available, but also have the $T_g$ and/or melting point ($T_m$) characteristics that allow for a pelletizable product.

The commercial exploitation of low $T_g$, substantially amorphous polyesters has been hindered in part by the difficulty in providing a suitable package form to the end-user. Some of the polyester raw materials encountered in the adhesives industry are illustrative of this situation. For example, a line of low $T_g$, amorphous, water-dispersible sulfopolyesters is available from Eastman Chemical Company, Kingsport, TN, under the AQ™ mark. These products (e.g., Eastman AQ 1350) are currently packaged as 50-pound blocks in release-lined cartons. Another example is found within the Mor-Ester product line of polyesters available from Morton Chemical Company. Mor-Ester 49001 is a soft, tacky, high molecular weight polyester that is supplied in the neat form as 6-pound blocks contained in a 36-pound box equipped with dividers. In both of these examples it is inconvenient, labor intensive, and costly to produce suitable package forms. Furthermore, the large unit mass of a 50-lb block is problematic to manufacturing operations as it may damage mixer blades and has less desirable heat transfer characteristics due to its low surface to volume ratio.

Packaging options, other than blocks of various sizes, also suffer from limitations and are not preferred. If the polyester is equilibrated at a temperature significantly lower than the $T_g$, it is possible to grind the product into a free-flowing granular form. Storing packages of the granules at a temperature less than the $T_g$ in a refrigerated environment can prevent blocking. Unfortunately, maintaining the temperature significantly below the $T_g$ is typically too burdensome to have practical value.

It is also known to treat the granules with a surface-adhereing agent (i.e., an antiblock agent), such as a talc, wax, or polymer powder that will inhibit blocking. (See, for example, U.S. Pat. No. 5,257,491). However, the granules must be treated with such large quantities of antiblock to achieve non-blocking that contamination of the product occurs resulting in deterioration of the polyester properties.

Amorphous polyolefins (APO) are another class of polymers used in the adhesives industry that suffer from the packaging limitations described supra. Reduced particle size product forms of APO's are manufactured by a method known as "slatting". (See, for example, U.S. Pat. Nos. 5,733,645 and 5,942,304). Slats may be obtained by coating a thin layer of a non-blocking polyolefin, such as low-density polyethylene (LDPE) around a ribbon of APO. LDPE has sufficient crystallinity to prevent blocking and during subsequent melt processing operations forms a compatible or miscible blend with the core material (APO). Polyolefins are nonpolar, addition polymers and there is no reaction that occurs between the APO and the exterior coating. The success of this packaging technology hinges on the ability of a exterior coating to be selected that may be used in small amounts and does not deleteriously contaminate the APO. Chain-growth polymerization techniques allow for control of monomer sequence distribution and polymer architecture, which results in a of variety products (i.e., physical properties) that may be obtained from a specific monomer or combination of monomers. This attribute of addition polymers facilitates the advantageous selection of the core and external coating materials for a slatted product form, since materials with high degrees of chemical identity may have different physical properties.

Unlike polyolefins, polyesters are step-growth polymers and it is typically not possible to control the sequence distribution of a chosen set of monomers during melt phase manufacturing processes. A specific composition has a given set of physical properties and selection of a shell material for an amorphous polyester core would require a chemically dissimilar polyester. The core and shell materials are not likely to have good compatibility, which may result in a non-viable product form.

In view of the above discussion, it is evident that there is a need for a substantially non-blocking low $T_g$ polyester article that does not block when contacted with other low $T_g$ polyesters. It is further apparent that there is a need for a low $T_g$ polyester that does not block and is not contaminated by an outer layer of non-blocking material.

SUMMARY OF THE INVENTION

The present invention provides an article of manufacture having a coating or is otherwise surrounded or wrapped in large measure by a second polymer which has non-blocking characteristics. In a preferred embodiment, the article possesses a core polymer which has a $T_g$ of less than 25° C. which is coated by or otherwise surrounded by a second polymer which has a $T_g$ of greater than 25° C. or a $T_m$ greater than 25° and less than 230° C., preferably less than 200° C. Further, preferred core polymers have a number average molecular weight of about 3000 to about 100,000. A further feature of the articles of the present invention is that when heated to temperatures of about 100 to 300° C., they undergo an ester exchange reaction to provide a substantially homogeneous polymer product.

DETAILED DESCRIPTION OF THE INVENTION

In a first aspect, the present invention provides an article of manufacture comprising:
a substantially amorphous polymer core portion having a $T_g$ less than 25° C.;
said core portion coated with or surrounded by an outer polymer composition having a Tg greater than 25° C. or a $T_m$ greater than 25° C. and less than 230° C., provided that said polymer Is other than poly (butylene terephthalate);
wherein the outer polymer composition sufficiently covers the core portion to prevent blocking when in contact with adjacent core portions,
wherein said amorphous polymer core portion and said outer polymer composition are selected from the group consisting of polyesters, polyester-ethers, polyesteramides, and polycarbonates.

In a preferred embodiment, the outer polymer composition will cover at least 60% of the surface area of the core portion. In a further preferred embodiment of this aspect of the invention, the core portion and the outer polymer composition undergo an exchange reaction, such as an ester exchange, an ester-amide exchange or a carbonate exchange, at a temperature of from about 100° to 300° C. Because the two polymers undergo this exchange reaction at elevated temperatures over time, the overall composition will eventually become substantially homogeneous. In other words, the starting core polymer will have one $T_g$ and the starting outer polymer will have a different (i.e., higher) $T_g$, but after the ester exchange reaction, the overall polymer composition will tend to coalesce into a substantially homogeneous polymer composition having one discernible $T_g$. Thus, in a preferred embodiment, the present invention provides the article as recited above, wherein said core portion and said outer polymer composition undergo an ester exchange reaction at a temperature of from about 100° to 300° C., and wherein observed $T_g$'S of said composition tend to coalesce into an essentially unitary $T_g$ over time at said temperature. In this regard, the material which is formed by such transesterification, due to its intermediate $T_g$, tends to act as a compatibilizer between the two polymers and thus aids in the eventual homogenization during formulation of the final product from which the articles of the present invention are prepared. As little as about 0.1% by weight of the minor component material, which in a preferred embodiment will be the outer composition portion, such intermediate $T_g$ material may provide such an observable beneficial effect.

The present invention thus provides an article of manufacture whereby a $T_g$, amorphous polyester may be packaged in a "freeflowing" or non-blocking physical form that does not undergo blocking during storage over extended periods of time. Blocking refers to the tendency of discrete polymer particles to adhere to themselves or other surfaces, such as their packaging container. This phenomenon results from the ability of a polymer to undergo viscoelastic flow over time and eventually distinct particles of the polymer will form an indistinguishable solid mass. The simplest illustration is one of an inner core of a low $T_g$, amorphous polyester completely surrounded by an outer shell of a different polyester that prevents blocking during storage under a given set of climatic conditions.

In a second aspect of the invention, there is provided an article of manufacture comprising:
a substantially amorphous polyester core portion having a $T_g$ of less than 25° C.;
said core portion coated with or surrounded by an outer polyester portion having a $T_g$ greater than about 25° C. or a $T_m$ greater than about 25° C. and less than 230° C., provided that said polyester is other than poly(butylene terephthalate);
wherein the outer polymer composition sufficiently covers the core portion to prevent blocking when in contact with adjacent core portions.

In this second aspect, it is preferred that the outer polyester composition cover at least about 60% of the surface area of the core portion. It is further preferred that the outer polyester composition has a $T_m$ of less than about 200° C., more preferably less than 150° C., and more preferably about 100° to 130° C. Further, it is preferred that the amorphous polyester core portion have a $T_g$ of about –50° C. to 20°, more preferably –35° to 15° C.

In a third aspect of the invention, there is provided an article of manufacture comprising:
(A) about 50 to 99.95% by weight of a core portion comprising a substantially amorphous polyester having a $T_g$ of less than 25° C. said substantially amorphous polyester comprising the reaction product of
(i) at least one aliphatic, cycloaliphatic, or aromatic dicarboxylic acid or its corresponding $C_1$–$C_4$ ester, provided that said acid is devoid of additional pendant polar functionality;
(ii) 0 to 40% mole percent, based on the total moles of acid of at least one aliphatic, cycloaliphatic, or aromatic dicarboxylic acid or its corresponding $C_1$–$C_4$ ester, wherein said add contains at least one polar functional group or ionic group;
(iii) at least one glycol wherein said glycol is selected from the group consisting of aliphatic glycols having 3 to 20 carbon atoms, cycloaliphatic glycols having 6 to 20 carbon atoms, aromatic glycols having 8 to 24 carbon atoms and mixtures thereof;
(iv) 0 to 100 mole %, based on the total moles of glycol, of a poly(alkylene glycol) having the structure

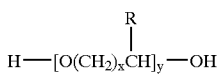

wherein R is H, $C_1-C_6$ alkyl or halogen, x is an integer of from 1 to 6, y is an Integer of from 2 to 500;
(v) 0 to 40 mole %, based on total moles of acid and glycol, of a multifunctional reactant containing at least three functional groups selected from acid, ester, hydroxyl or mixtures thereof;
wherein said substantially amorphous polyester is prepared from substantially equimolar proportions of acid or ester (100 mole %) and glycol equivalents (100 mole %);
and wherein the surface of the core portion is sufficiently covered to prevent blocking when in contact with adjacent core portions, by
(B) about 0.05 to less than 50% by weight of an outer composition comprising a polyester having a Tg of greater than 25° C. and/or a Tm of greater than 25° C. and less than 230° C., provided that said polyester is other than poly(butylene terephthalate), comprising the reaction product of
(i) at least one aliphatic, cycloaliphatic, or aromatic dicarboxylic acid or its corresponding $C_1-C_4$ ester, provided that said acid is devoid of additional pendant polar functionality;
(ii) 0 to 25 mole %, based on total moles of acid of at least one aliphatic, cycloaliphatic, or aromatic dicarboxylic acid or its corresponding $C_1-C_4$ ester, wherein said acid contains at least one polar functional group or ionic group;
(iii) at least one glycol, wherein said glycol is selected from the group consisting of aliphatic glycols having 3 to 20 carbon atoms, cycloaliphatic glycols having 6 to 20 carbon atoms, aromatic glycols having 8 to 24 atoms and mixtures thereof;
(iv) 0 to 80 mole %, based on the total moles of glycol of a poly(alkylene glycol) having the structure

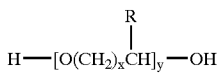

wherein R is H, $C_1-C_6$ alkyl, or halogen x is an integer from 1 to 6, y is an integer of from 2 to 500;
(v) 0 to 10 mole %, based on the total moles of acid and glycol, of a multifunctional reactant containing at least three functional groups selected from acid, ester, hydroxyl, or mixtures thereof;
wherein said polyester is prepared from substantially equal molar proportions of acid or ester (100 mole %) and glycol equivalents (100 mole %).

In this third aspect, the Tg of the substantially amorphous polyester is preferably −50° to 20° C., more preferably −35 to 15° C. Further, component A (ii) is preferably utilized in an amount of about 2.5 to 25 mole %, more preferably about 5 to 20 mole %, based on the total moles of acid. Component A (iv) is preferably utilized in an amount of about 20 to 100 mole %, more preferably about 50 to 100 mole %, based on the total moles of glycol. Component A (v) is preferably utilized in an amount of about 0 to 7 mole %, based on the total moles of acid and glycol. The multifunctional reactant referred to above is preferably selected from the group consisting of trimethylolpropane, trimellitic anhydride, pentaerythritol, pyromellitic dianhydride, and glycerol.

Component B (ii) is preferably utilized in an amount of about 0 to 10 mole %, most preferably about 0 to 5 mole %, based on the total moles of acid.

Component B (iv) is preferably utilized in an amount of about 10 to 70 mole %, based on the total moles of glycol. The multifunctional reactant in component B (v) is preferably selected from the group consisting of of trimethylolpropane, trimellitic anhydride, pentaerythritol, pyromellitic dianhydride, and glycerol.

Components A (iv) and B (iv) are preferably selected from diethylene glycol, triethylene glycol, and poly(ethylene glycol) having a molecular weight of from about 600 to 3000.

In an especially preferred embodiment, the core portion is covered by an outer polymer composition, wherein the outer polymer composition is comprised of about 35–55 mole % of residues of terephthalic acid, 65–45 mole % of adipic acid, and at least about 80 mole % of residues of 1,4-butanediol. In an especially preferred embodiment, the outer polymer composition is comprised of about 41–45 mole %, most preferably about 43% of terephthalic acid residues, 59–55, most preferably about 57 mole % of residues of adipic acid, and at least about 90 mole %, most preferably about 100 mole % of residues of 1,4-butanediol. In such cases, the $T_m$ is about 100–130° C. Examples of such compositions are set forth in U.S. Pat. Nos. 5,446,079; 5,599,858; and 5,580,911, incorporated herein by reference.

In the preparation of the polyesters referred to above, acids and glycols may be combined in any manner to achieve the above criteria, although the polymer will contain substantially equal proportions of acid equivalents and hydroxyl equivalents. Typically, it is advantageous to combine more than one acid and/or more than one glycol to obtain an amorphous polyester. Geometrical form is not a limitation and this invention includes linear, branched, dendritic, block, and cyclic polymer architectures. Crosslinked or gelled (thermoset) polyesters are generally not suitable since they can not be subjected to melt processing operations without significant degradation. The value of 25° C. is often used as a literature benchmark for standard or ambient or room temperature. Therefore, an amorphous polymer having a $T_g \leq 25°$ C. will behave as a viscous liquid at or above said ambient temperature and will exhibit cold flow properties leading to dimensional instability. The general trend relating monomer (both acid and glycol) structure to the polyester $T_g$ is:

aromatic>cycloaliphatic>linear with the additional qualification that increasing the ring size or the chain length of a monomer lowers the $T_g$ further. Monomers containing maintain heteroatoms may be useful to impart a sub-ambient $T_g$ to a polyester. A preferred example is a polyethylene glycol having the structure as defined by the formula:

H—(OCH₂CH₂)ₙ—OH where $2 \leq n < 500$. Higher order polyalkylene glycols of varying molecular weights, including polypropylene glycol, polybutylene glycol, and polytetramethylene glycol may be used as well. The molecular weight of the core polyester will depend on the requirements of the end-use and it is known that the viscosity of a liquid polymer increases with increasing molecular weight. Therefore, decreasing the molecular weight tends to exacerbate the blocking problem, while a very high molecular weight may result in a viscosity sufficiently high to delay the onset of blocking. There is also a relationship between molecular weight and $T_g$; increasing the molecular weight will lead to increased $T_g$ until a plateau is reached. The molecular weight of polyesters is conveniently measured by inherent (dilute solution) viscosity in a 60/40 parts by weight solvent of phenol\tetrachloroethane at 25° C. and a concentration of about 0.25 g of polymer in 100 mL of solvent. In a preferred embodiment, the molecular weight for the core polyesters disclosed herein is normally within an inherent viscosity range from 0.05-2 dL/g.

The outer polyester composition serves as a barrier to prevent the core polyester from blocking. This may be accomplished by selecting a polyester with a $T_g$>25° C., preferably>35° C., and more preferably>50° C. Another option is to employ a partially crystalline shell polyester. Crystallinity is defined as the presence of a melting transition ($T_m$) Polyesters having a both low (<25° C.) $T_g$ and a high (>50° C.) $T_m$ are known and represent a preferred embodiment of the shell material. A low $T_g$ can provide flexibility to the outer polyester shell, while the high $T_m$ prevents blocking. In this regard, preferred $T_m$'s for the shell, or outer layer material are 25° to 230° C., more preferably 25° to 200° C., and more preferably 50° to 150° C. The actual requirements of the shell or outer layer polyester will depend on the time and temperature extremes encountered by the storage environment as well as the desired process conditions of the end user when the formulated product are prepared using the articles of the present invention. In certain geographical regions warehouse temperatures can easily reach 50° C. for extended periods of time. An opposite situation would be the storage of a just-in-time inventoried product in a cool, dry climate.

There are numerous references in the literature relating to the reaction of a polyester with other polyesters, such as U.S. Pat. No. 5,539,078 and U.S. Pat. No. 5,695,710, the contents of which are incorporated herein by reference, and reactions with other condensation polymers, such as the ester-carbonate interchange described in U.S. Pat. No. 5,207,967, the contents of which are incorporated by reference. An example of a reaction between two polyesters is a transesterification reaction which converts separate polyesters into a homogeneous blend, or compatible mixture through the in situ generation of a hybrid polyester. The scope of the present invention also includes the utilization of the described core and shell methodology with any suitable condensation polymer as required by the ultimate use. Conditions required for transesterification will vary depending on the polymer structure and desired completeness of reaction. Amorphous polyesters based on linear aliphatic acids and glycols tend to undergo facile transesterification, while a crystalline aromatic polyester may require more strenuous conditions. For a given composition, the temperature and time of the melt processing operation will affect the transesterification kinetics and completeness of reaction. Melt processing times will typically vary from several minutes, such as an extrusion operation, to 12 or more hours that could be required in a batch compounding operation. The actual process equipment is not critical other than sufficient agitation is required to homogenize the core and shell polyesters. Process temperatures are in the range of 100° to 350° C., preferably 125° to 325° C., and more preferably 150° to 300° C. Catalysts may be used to facilitate the transesterification reaction. Furthermore, residual catalysts may be employed to synthesize either the core or shell polyesters may again function as catalysts for the melt phase transesterification between the core and shell polyesters. Useful catalysts include oxides, organic and inorganic salts, and organometallic compounds of metals, such as titanium, zinc, manganese, and tin.

Other metals may also be useful according to the teachings of U.S. Pat. Nos. 2,465,319 and 3,377,320, the contents of which are incorporated herein by reference.

The relative proportions of the core and shell polyesters are not critical and may be varied based on the end-use requirements. Therefore, the outer or shell polyester may in principle comprise from 0.05% to 99.95% by weight of the package. One of the most preferred modes of practice is for the shell polyester to function simply as a protective barrier for the active ingredient that is comprised by the core polyester. In this embodiment the shell should be as thin as possible and will comprise from 0.05% to 10% by weight of the package unit. In other cases, a final formulation may require two separate polyesters of which one may be used as the core and the other as the shell. For this situation it may be possible to adjust the ratio of core to shell material to correspond to the desired levels of each component in the final formulation.

The physical form and size of an Individual package unit is also not critical and will be dictated by the requirements of the end-user. Thus the scope of this invention includes small pieces, such as pellets or pastilles weighing one gram or less, multigram forms, such as briquets or slats, and larger quantities, such as kilogram or greater sized block or slabs. Moreover, the core layer material and the outer layer material may be co-extruded to provide a non-blocking material. The preferred package unit size ranges from 0.5 grams to 10 kilograms and more preferably 1 gram to 1 kilogram. One variation is to synthesize the core polyester and then while discharging the reactor to coextrude molten rods containing the non-blocking shell polyester into a water bath or onto a chilled casting belt. The cooled rods could then be cut or pinched/sealed into the desired lengths. Another variation would be to charge molten polyester (core) into a polyester pouch possessing a sufficiently high melting point to contain the polymer during cooling. In a preferred embodiment, the outer composition has a melting point less than the temperature of the subsequent melt processing operation. Another variation would be to cut a cold block of core polyester into smaller blocks and wrap the blocks with a film (shell) to provide a non-blocking package form. Although not preferred it is possible for the rod assemblies to be cut into pieces having open ends that could be prevented from blocking by the addition of an additive, such as a talc, wax, or powdered polymer. Also included is the use of other additives, such as UV stabilizers, antioxidants, pigments, flame retardants, biocides, and so forth.

The articles of the present invention are useful as components of hot melt adhesive compositions. In a further embodiment, the shell and/or core portions may comprise a tackifying resin and/or wax. Further examples of adhesive ingredients which may be present include those set forth in U.S. Pat. No. 5,750,605, incorporated herein by reference.

In this regard, the core and/or outer polymer composition further comprises:

(i) about 0 to 80% by weight of a compatible tackifier;
(ii) about 0 to 40% by weight of a compatible plasticizer;
(iii) about 0 to 50% by weight of a wax diluent;
(iv) about 0 to 60% by weight of a compatible crystalline thermoplastic polymer,
(v) about 0 to 60% by weight of a compatible amorphous thermoplastic polymer;
(vi) about 0 to 3% by weight of a stabilizer;
(vii) about 0 to 60% by weight of a compatible crystalline thermoplastic polymer;
(viii) about 0 to 60% of a compatible amorphous thermoplastic polymer; wherein said percentages are based on the total weight of the article, the total being 100%.

In a further preferred embodiment, the core and/or outer polymer composition further comprises:
   (i) about 0 to 80% by weight of a compatible tackifier;
   (ii) about 0 to 40% by weight of a compatible plasticizer;
   (iii) at least one crystalline material selected from the group consisting of
      (a) 5 to 40% by weight of a compatible wax diluent, with a molecular weight below 500 g/mole containing at least one polar functional group, said group being present at a concentration greater than $3 \times 10^{-3}$ equivalents per gram; and
      (b) 0 to 60% by weight of a crystalline thermoplastic polymer, and
   (iv) 0 to 3% by weight of a stabilizer, wherein said percentages are based on the total weight of the article, the total being 100%.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) rosin esters such as glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; and (3) phenolic modified (a) terpene or (b) α-methyl styrene resins as well as the hydrogenated derivatives thereof such, for example, as the resin product resulting from the condensabon, in an acidic medium of a bicyclic terpene and a phenol. Mixtures of two or more of the above described tackifying resins, as well as blends of the above resins with small amounts of (e.g., less than about 20% of the adhesive) less compatible resins may be utilized for some formulations.

Representative of the latter group of polar tackifiers include ionic materials such as FORAL NC available from Hercules; non-ionic materials such as FORAL AX also from Hercules; alpha methyl styrene phenolics such as Uratak 68520 from DSM Resins, rosin esters such as UNITAC R100L available from Union Camp and terpene phenolics such as NIREZ 300, available from Arizona Chemical. In the formulations, typically terpene phenolic tackifiers such as NIREZ 300 are generally not water dispersible; however, because the sulfonated polyester is very water sensitive, incorporating the tackifier at low levels (i.e., less than 50%) into the present adhesive formulations does not inhibit the water sensitivity of the adhesives.

Furthermore, the use of sucrose benzoate as a tackifier has been found to be particularly useful due to its biodegradable and compostable character. The sucrose benzoate is preferably utilized in its alcohol soluble form wherein the sucrose is partially esterified. This grade is a light colored, clear non-crystalline solid with a softening point of about 95° C. Alternatively, the non-alcohol organic soluble grade, a water-clear, non-crystalline flake solid having a softening point of 98° C. may also be used. Both grades are available commercially from Velsicol Chemical Corporation.

Additionally, small amounts (ie., less than 20% by weight) of non-polar tackifiers may be used in combination with the previously described tackiflers. Typical of this class of non-polar tackifiers are the aromatic/aliphatics such as ECR-149B from Exxon Chemical; aromatics such as KRI-STALEX 3085 from Hercules; aliphatic hydrocarbons such as WINGTAC 95 from Goodyear; cyclic aliphatics such as EASTOTAC H-100 from Eastman Chemical. While the tackifier may comprise up to about 70% of the adhesive, it is generally used in amounts of about 10 to 60% by weight.

Depending on the end-use application, and particularly for uses requiring highly flexible adhesives, various compatible liquid plasticizers or extending oils are present in the composition. Preferred compatible plasticizers are non-crystalline in nature and include polar liquid plasticizers including phthalate plasticizers such as dioctyl phthalate and butyl benzyl phthalate (e.g., SANTICIZER 160 from Monsanto); liquid polyesters (non-crystalline) such as DYNACOL 720 from Huls and the liquid polymeric plasticizer available from C. P. Hall; benzoate plasticizers such as 1,4-cyclohexane dimethanol dibenzoate (e.g., BENZOFLEX 352 available commercially from Velsicol), diethylene glycol/dipropylene glycol dibenzoate (e.g., BENZOFLEX 50 from Velsicol) and diethylene glycol dibenzoate where the mole fraction of hydroxyl groups which have been esterified ranges from 0.5 to 0.95 (e.g. BENZOFLEX 2-45 High Hydroxyl also from Velsicol); phosphate plasticizers such as t-butylphenyl diphenyl phosphate (e.g., SANTICIZER 154 available commercially from Monsanto); poly (ethylene glycol) with molecular weight below about 1000 and derivatives of poly(ethylene glycol) (e.g., PYCAL 94, the phenyl ether of PEG, available commercially from ICI); ethoxylated bis phenol A (e.g., MACOL 206 EM from PPG industries); dinonyl phenol ethyoxylates (e.g., SURFONIC DNP 100 from Huntsman Chemical Corp.); liquid rosin derivatives having Ring and Ball melting points below about 60° C. such as the methyl ester of hydrogenated rosin (eg., HERCOLYN D from Hercules); as well as vegetable and animal oils such as glycerol esters of fatty acids and polymerization products thereof. Particularly preferred plasticizers include phenyl ether of polyethylene-glycol; butyl benzyl phthalate; benzoates such as 1,4-cyclohexane dimethanol dibenzoate, diethylene glycol/dipropylene glycol dibenzoate, and diethylene glycol dibenzoate where the mole fraction of hydroxyl groups which have been esterified ranges from 0.5 to 0.95. These plasticizers are also polar in chemical composition and show improved compatibility over plasticizers which are not polar such as mineral oil.

It will be recognized that the end use application will greatly affect the choice of plasticizing diluent with adhesives which require biodegradability using plasticizers such as benzoates, phthalates, liquid polyesters as well as vegetable and animal oils. Applications where water dispersibility is more essential will benefit from the use of polyethylene glycol or water soluble ethoxylated alcohols (e.g. PYCAL 94) as the plasticizing component. There may also be present small amounts (i.e. less than about 10%) of non-polar plasticizing diluents such as mineral oil and polybutene.

In a preferred embodiment of the invention, the adhesives of the invention can be used in conjunction with one or more crystalline wax materials. In such cases, the waxes are employed at levels of 10 to about 40% by weight to reduce the melt viscosity while improving heat resistance. The waxes used must be highly polar, containing $\geq 3 \times 10^{-3}$ equiv/g of polar groups and at least one group per molecule and with a molecular weight below 500 g/mole Higher concentrations of polar groups are necessary for higher molecular weight waxes. These polar groups include hydroxyl, amide (primary, secondary, and tertiary), sulfone, phosphate esters, sulfonamide, carbonate, urea, amine, urethane, carboxylic acid; and carboxylate salts, ureas, and sulfonate salts. Suitable crystalline polar waxes include 12-hydroxystearamide, N-(2-hydroxy ethyl) 12-hydroxystearamide (PARICIN 230 from CasChem), stearamide (KEMAMIDE S from Witco), glycerin monostearate, sorbitan monostearate, and 12-hydroxy stearic acid. Also useful in combination with the above are the less polar waxes such as N, N'-ethylene-bis-stearamide (KEMAMIDE W-40 from Witco), hydrogenated castor oil (castor wax), oxidized synthetic waxes, and functionalized synthetic waxes such as oxidized polyethylene waxes (PETROLITE E-1040).

In a further preferred embodiment, such crystalline components may alternatively be crystalline thermoplastic polymers which can be present in the adhesive, preferably at 5 to 60%, more preferably 10 to 40% by weight These polymers are employed in order to impart flexibility, toughness and strength. Suitable crystalline thermoplastic polymers include ethylene vinyl acetate copolymers containing about 12 to 50% vinyl acetate, ethylene acrylic acid, ethylene methyl acrylate and ethylene n-butyl acrylate copolymers as well as polylactide, caprolactone polymers and poly(hydroxy-butyrate/hydroxyvalerate), polyvinyl alcohol, linear saturated polyesters such as DYNAPOL or DYNACOLL polymers from Huls, poly(ethylene oxide) polyether amide or polyester ether block copolymers available from Atochem (PEBAX) or Hoechst Celanese (RITEFLEX) respectively, and polyamide polymers such as those available from Union Camp (UNIREZ) or Hulls (VESTAMELT) or EMS-Chemie (GRILTEX).

Preferred among these crystalline polymers are other polyester polymers such as those available from EMS-Chemie, Sumter, S. C., under the tradename GRILTEX, or from Huls America, Piscataway, N.J., under the tradenames DYNAPOL and DYNACOLL (lower molecular weight). Also preferred are polyamides such as those available from Union Camp, Wayne, N.J., under the UNIREZ tradename or copolyamides available from Huls under the VESTAMELT tradename and also from EMS-Chemle also under the GRILTEX name. By crystalline is meant the saturated polyesters and dimer acid based polyamides which are described in the Handbook of Adhesives, p. 478, C. Rossitto.

It may also be desirable to incorporate into the hot melt adhesive up to 20% by weight of certain other hydrophilic non-crystalline polymers such as hydroxyethyl cellulose, hydroxypropyl cellulose, polyvinyl methyl ether, polyvinylpyrrolidone, polyethyloxazoline, starch or cellulose esters, particularly the acetates with a degree of substitution less than 2.5; the latter polymers functioning to increase the water sensitivity of the adhesives which may be desired for some applications.

Other hydrophobic compatible polymers include elastomeric polymers such as styrene containing block copolymers, e.g., styrene-isoprene-styrene, epoxidized polyisoprene, styrene-butadiene-styrene, styrene-ethylene butylene-styrene, styrene-ethylene propylene styrene may also be present at levels up to about 30% by weight Of these polymers, those based on styrene-isoprene-styrene are most preferred.

Among the applicable stabilizers or antioxidants which may be induded herein are high molecular weight hindered phenols and multifunctional phenols such as sulfur and phosphorous-containing phenols. Representative hindered phenols include: 1,3,5-trimethyl-2,4,6-tris(3,5-di-tert-butyl hydroxyphenyl) proplonate; n-octadecyl 3,5-di-tert-butyl-4-hydroxyphenyl) proplonate; 4,4'-methienebis (2,6-di-tert-butylphenol); 4,4'-thiobis (6-tert-butylcresol); 2,6-di-tert-butylphenol; 6-(4-hydroxyphenoxy)-2,4-bis(n-octylthio)-1, 3,5-triazine; di-n-octadecyl-3,5-di-tert-butyl-4-hydroxy-benzylphosphonate; 2-(n-octylthio)-ethyl 3,5-di-tert-butyl-4-hydroxybenzoate; and sorbitol hexa 3-(3,5-di-tert-butyl-4-hydroxyphenyl)propionate. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc.

The hot melt adhesive compositions of the invention may be formulated using techniques known in the art.

EXAMPLES

Example 1

Blocking Potential of a High versus Low Tg Version of Cycloallphatic Polyester

A cycloaliphatic polyester containing 30 mole % of 1,4-cydohexanedimethanol (CHDM) was analyzed to have a $T_g$ of 1° C. and a similar polyester containing 60 mole % CHDM was determined to have a $T_g$ of 35° C. The lower $T_g$ polyester was fabricated into a cylindrical form and encased in a film of the higher $T_g$ composition to form a non-blocking package assembly. The blocking potential of each polyester separately using aluminum compaction cells designed to measure powder caking were employed. The cells were designed so that a milled version of the above polyesters was loaded into a 16.4 cm$^3$ (1 inch$^3$) suspended section of the cell, which is placed under a 340 gram load at a desired temperature. Both polyesters were prepared for testing by drying overnight in vacuo at 80° C. and cryo-grinding to a particle size of <3-mm. Test cells were charged with polymer granules and stored in 23° and 50° C. temperature controlled environments. Test cells were removed from storage after 1 day, 1 week, and 4 weeks for evaluation; triplicate test assemblies were employed since a sample was not returned to storage after evaluation. Each test cell was opened at the appropriate time and a qualitative estimate was made to measure the amount of force required to break the polymer "cake" apart. The following rating system was used to estimate the blocking potential of the polyester granules:

1 —Granules fall apart when chamber is opened

2 —Polyester crumbles when handled gently

3 —Slight pressure required to break granules apart

4 —Firm pressure needed to break granules apart

5 —Polyester is compressed and can not be separated with a low number indicative of improved blocking resistance. The results obtained are contained in Table 1 and clear show that the low $T_g$ polyester has no blocking resistance, while all test samples of the high $T_g$ polyester remain viable.

The efficacy of the packaging concept was then illustrated by melt blending various ratios of the low and high $T_g$ polyesters. Since a preferred practice of this invention is to cover the core polyester with as thin a shell as possible, blends were made containing 1, 10, and 50 weight % of the high $T_g$ (shell) polyester. A Haake-Buchler, System 40, rheomixer fitted with a 35 gram bowl and kneading screws was preheated to 250° C. before charging the desired amounts of polyester granules via a TEFLON®funnel. The polyesters were mixed for 7 minutes before the blend was recovered for analysis. Less than 3 minutes was required in each case to achieve null torque, which is indicative of good mixing. The 1 and 10 weight% blends were clear, while the 50 weight % blend was slightly hazy. All three blends showed a single $T_g$, which is indicative of a single composition or compatibilized blend. Molecular weight was monitored by inherent viscosity (IhV) and no degradation was noted as all samples were within 0.44+−0.02 dL/g.

TABLE 1

Blocking Data for Low and High $T_g$ Polyesters

| Sample | Time | Temperature | |
| --- | --- | --- | --- |
| | | 23° C. | 50° C. |
| Low $T_g$ Polyester | 1 day | 5 | 5 |
| | 1 week | 5+ | 5+ |
| | 4 weeks | 5++ | 5++ |
| High $T_g$ Polyester | 1 day | 1 | 1 |
| | 1 week | 1 | 2 |
| | 4 weeks | 2 | 2 |

Example 2–4

Table 2 contains the results for blends of various core/shell polyester combinations. In the abbreviations, IPA means isophthalic acid, 5-SSIPA means 5-sodioisophthalic acid, EG means ethylene glycol, DEG means diethylene glycol, 1,4-CHDA means 1,4-cyclohexanedicarboxylic acid and CHDM means cyclohexanedimethanol.

The general synthesis procedure is described below. All the compositions in Table 2 were obtained in the same manner by changing the monomers and/or monomer ratios with appropriate process times, temperatures, and pressures.

A 500 mL round bottom flask equipped with a ground glass head, agitator shaft, nitrogen inlet, and a sidearm to allow for removal of volatile materials was charged with 74.7 grams (0.45 moles) isophthalic acid, 14.8 grams (0.05 mole) dimethyl-5-sodiosulfoisophthalate, 13.5 grams (0.23 mole) ethylene glycol, 78.8 grams (0.53 mole) triethylene glycol, 0.4 grams (0.005 mole) of sodium acetate, and 1.1 mL of a 1.21% (w/v) solution of titanium(IV)isopropoxide in n-butanol. The flask was purged with nitrogen and immersed in a Belmont metal bath at 230° C. for 70 minutes and 210° C. for 120 minutes under a slow nitrogen sweep with sufficient agitation. After elevating the temperature to 250° C., the pressure was gradually reduced from 760 mm to 0.2 mm over the course of 35 minutes and held for an additional 140 minutes to perform the polycondensation. Nitrogen was introduced to displace the vacuum and the clear, golden yellow polymer was allowed to cool before removal from the flask. An inherent viscosity of 0.36 dL/g was determined for the recovered polymer according to ASTM D3835-79. NMR analysis indicated that the actual acid composition was 90.5 mole % isophthalate and 9.5 mole % 5-sodiosulfoisophthalate. GC analysis for glycols showed 28 mole % ethylene glycol, 71 mole % triethylene glycol, and 1 mole % diethylene glycol. A glass transition temperature ($T_g$) of 8° C. was obtained from thermal analysis by DSC.

Example 2 shows the effect of varying the glycol ratio on Tg

Example 3 illustrates that changing the isomer ratio of a single monomer may provide a core/shell system Example 4 demonstrates how a crystalline shell may be advantageously used over an amorphous core to yield an amorphous blend All of the blends were 90% core and 10% shell compositions by weight The blends were observed to be homogeneous after melt processing and transesterification is evidenced by the single Tg obtained for each blend that is an average of the component Tg's. Example 3 showed a lower Tg than the predicted average due to the lower molecular weight (IV) observed for the blend.

| Example | Compositions (mole %) | IV (dL/g) | Tg (° C.) |
| --- | --- | --- | --- |
| 2 | IPA = 90, 5-SSIPA = 10, EG = 30, TEG = 70 (Core) | 0.36 | 8 |
| | IPA = 90, 5-SSIPA = 10, EG = 90, TEG = 10 (Shell) | 0.21 | 55 |
| | BLEND | 0.33 | 12 |
| 3 | 1,4-CHDA (cis/trans: 60/40) = 92, 5-SSIPA = 8, DEG = 40, CHDM = 60 (Core) | 0.60 | 23 |
| | 1,4-CHDA (cis/trans: 5/95) = 92, 5-SSIPA = 8, DEG = 40, CHDM = 60 (Shell) | 0.59 | 37 |
| | BLEND | 0.43 | 20 |
| 4 | 1,4-CHDA = 100, DEG = 80, CHDM = 20 (Core) | 0.44 | −7 |
| | 1,4-CHDA = 100 CHDM = 100 (Shell) | 0.49 | 63, $T_m$ = 226 |
| | BLEND | 0.42 | −1, no $T_m$ |

We claim:

1. An article of manufacture comprising:
   50 to 99.95, by weight, a substantially amorphous polymer core portion having a $T_g$ less than 25° C.;
   said core portion coated with or surrounded by an outer polymer composition, present in an amount of 0.05 to 50%, by weight, said outer polymer composition having a Tg greater than 25° C. or a $T_m$ greater than 25° C. and less than 230° C., provided that said polymer is other than poly(butylene terephthalate);
   wherein the outer polymer composition sufficiently covers the core portion to prevent blocking when in contact with adjacent core portions;
   wherein said amorphous polymer core portion and said outer polymer composition are selected from the group consisting of polyesters, polyester-ethers, polyesteramides, and polycarbonates;
   wherein at least a portion of the polymer core and outer polymer undergo an exchange reaction at a temperature of from about 100° C. to 300° C., and wherein observed Tg's of said core and outer composition tend to coalesce into an essentially unitary Tg over time at said temperature.

2. The article of claim 1, wherein the outer polymer composition covers at least about 60% of the surface area of the core portion.

3. The article of claim 1, wherein said article is in the form of a pellet, a pastille, or a block.

4. The article of claim 1, wherein the core and/or outer polymer composition further comprises:
   (i) about 0 to 80% by weight of a compatible tackifier;
   (ii) about 0 to 40% by weight of a compatible plasticizer;
   (iii) about 0 to 50% by weight of a wax diluent;
   (iv) about 0 to 60% by weight of a compatible crystalline thermoplastic polymer;
   (v) about 0 to 60% by weight of a compatible amorphous thennoplastic polymer;

(vi) about 0 to 3% by weight of a stabilizer;

(vii) about 0 to 60% by weight of a compatible crystalline thermoplastic polymer;

(viii) about 0 to 60% of a compatible amorphous thermoplastic polymer; wherein said percentages are based on the total weight of the article, the total being 100%.

5. The article of claim 1, wherein said core portion and/or said outer polymer portion further comprises (i) about 0 to 80% by weight of a compatible tackifier;

(ii) about 0 to 40% by weight of a compatible plasticizer;

(iii) at least one crystalline material selected from the group consisting of
(a) 5 to 40% by weight of a compatible wax diluent, with a molecular weight below 500 g/mole containing at least one polar functional group, said group being present at a concentration greater than $3 \times 10_{-3}$ equivalents per gram; and
(b) 0 to 60% by weight of a crystalline thermoplastic polymer; and (iv) 0 to 3% by weight of a stabilizer, wherein said percentages are based on the total weight of the article, the total being 100%.

6. An article of manufacture comprising:

50 to 99.95%, by weight, a substantially amorphous polyester core portion having a $T_g$ of less than 25° C.;

said core portion coated with or surrounded by an outer polymer composition, present in an amount of 0.05 to 50%, by weight, said outer polymer composition having a $T_g$ greater than about 25° C. or a $T_m$ greater than about 25° C. and less than 230° C., provided that said polymer is other than poly(butylene terephthalate);

wherein the outer polymer composition sufficiently covers the core portion to prevent blocking when in contact with adjacent core portions;

wherein said outer polymer composition is selected from the group consisting of polyesters, polyester-ethers, polyesteramides, and polycarbonates;

wherein at least a portion of the polyester core and outer polymer undergo an exchange reaction at a temperature of from about 100° C. to 300° C., and wherein observed Tg's of said core and outer composition tend to coalesce into an essentially unitary Tg over time at said temperature.

7. The article of claim 6, wherein the outer polymer composition covers at least about 60% of the surface area of the core portion.

8. The article of claim 6, wherein the outer polyester composition has a $T_m$ of less than about 150° C.

9. The article of claim 6, wherein the outer polyester composition has a $T_m$ of about 100° to 130° C.

10. The article of claim 9, wherein the outer polymer composition is comprised of about 35–55 mole % of residues of terephthalic acid, 65–45 mole % of adipic acid, and at least about 80 mole % of residues of 1,4-butanediol.

11. The article of claim 9, wherein the outer polymer composition is comprised of about 41–45 mole of terephthalic acid residues, 59–55 mole % of residues of adipic acid, and at least about 90 mole % of residues of 1,4-butanediol.

12. The article of claim 6, wherein said amorphous polyester core portion has a $T_g$ of −50° to 20° C.

13. The article of claim 12, wherein said article is in the form of a pellet, a pastille, or a block.

14. The article of claim 6, wherein said amorphous polyester core portion has a $T_g$ of −35° to 15° C.

15. The article of claim 6, wherein said article is in the form of a pellet, a pastille, or a block.

16. An article of manufacture comprising:

(A) about 50 to 99.95% by weight of a core portion comprising a substantially amorphous polyester having a $T_g$ of less than 25° C. said substantially amorphous polyester comprising the reaction product of (i) at least one aliphatic, cycloaliphatic, or aromatic dicarboxylic acid or its corresponding $C_1$–$C_4$ ester, provided that said acid is devoid of additional pendant polar functionality;

(ii) 0 to 40% mole percent, based on the total moles of acid of at least one aliphatic, cycloaliphatic, or aromatic dicarboxylic acid or its corresponding $C_1$–$C_4$ ester, wherein said acid contains at least one polar functional group or ionic group;

(iii) at least one glycol wherein said glycol is selected from the group consisting of aliphatic glycols having 3 to 20 carbon atoms, cycloaliphatic glycols having 6 to 20 carbon atoms, aromatic glycols having 8 to 24 carbon atoms and mixtures thereof;

(iv) 0 to 100 mole %, based on the total moles of glycol, of a poly(alkylene glycol) having the structure

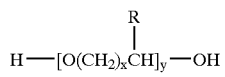

wherein R is H, $C_1$–$C_6$ alkyl or halogen, x is an integer of from 1 to 6, y is an integer of from 2 to 500;

(v) 0 to 40 mole %, based on total moles of acid and glycol, of a multifunctional reactant containing at least three functional groups selected from acid, ester, hydroxyl or mixtures thereof;

wherein said substantially amorphous polyester is prepared from substantially equimolar proportions of acid or ester (100 mole %) and glycol equivalents (100 mole %);

and wherein the surface of the core portion is sufficiently covered to prevent blocking when in contact with adjacent core portions, by (B) about 0.05 to less than 50% by weight of an outer composition comprising a polyester having a Tg of greater than 25° C. and/or a Tm of greater than 25° C. and less than 230° C., provided that said polyester is other than poly(butylene terephthalate), comprising the reaction product of (i) at least one aliphatic, cycloaliphatic, or aromatic dicarboxylic acid or its corresponding $C_1$–$C_4$ ester, provided that said acid is devoid of additional pendant polar functionality;

(ii) 0 to 25 mole %, based on total moles of acid of at least one aliphatic, cycloaliphatic, or aromatic dicarboxylic acid or its corresponding $C_1$–$C_4$ ester, wherein said acid contains at least one polar functional group or ionic group;

(iii) at least one glycol, wherein said glycol is selected from the group consisting of aliphatic glycols having 3 to 20 carbon atoms, cycloaliphatic glycols having 6 to 20 carbon atoms, aromatic glycols having 8 to 24 atoms and mixtures thereof;

(iv) 0 to 80 mole %, based on the total moles of glycol of a poly(alkylene glycol) having the structure

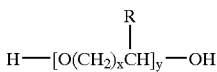

wherein R is H, $C_1$–$C_6$ alkyl, or halogen, x is an integer from 1 to 6, y is an integer of from 2 to 500;

(v) 0 to 10 mole %, based on the total moles of acid and glycol, of a multifunctional reactant containing at least three functional groups selected from acid, ester, hydroxyl, or mixtures thereof;

wherein said polyester is prepared from substantially equal molar proportions of acid or ester (100 mole %) and glycol equivalents (100 mole %); and wherein at least a portion of the polyester core and outer polyester undergo an exchange reaction at a temperature of from about 100° C. to 300° C., and wherein observed Tg's of said core and outer composition tend to coalesce into an essentially unitary Tg over time at said temperature.

17. The article of claim 16, wherein the Tg of said substantially amorphous polyester is −50° to 20° C.

18. The article of claim 16, wherein the Tg of said substantially amorphous polyester is −35° to 15° C.

19. The article of claim 16, wherein component A (ii) is utilized in an amount of about 2.5 to 25 mole %, based on the total moles of acid.

20. The article of claim 16, wherein component A (ii) is utilized in an amount of about 5 to 20 mole %, based on the total moles of acid.

21. The article of claim 16, wherein component A (iv) is utilized in an amount of about 20 to 100 mole %, based on the total moles of glycol.

22. The article of claim 21, wherein the poly(alkylene glycol) is poly(ethylene glycol).

23. The article of claim 16, wherein the component A (iv) poly(alkylene glycol) is diethylene glycol or triethylene glycol.

24. The article of claim 16, wherein the component B (iv) poly(alkylene glycol) is diethylene glycol or triethylene glycol.

25. The article of claim 16, wherein component A (v) is utilized in an amount of about 0 to 7 mole %, based on the total moles of acid and glycol.

26. The article of claim 16, wherein the multifunctional reactant is selected from the group consisting of trimethylolpropane, trimellitic anhydride, pentaerythritol, pyromellitic dianhydride, and glycerol.

27. The article of claim 16, wherein component B (ii) is utilized in an amount of about 0 to 5 mole %, based on the total moles of acid.

28. The article of claim 16, wherein component B (iv) is utilized in an amount of about 10 to 70 mole %, based on the total moles of glycol.

29. The article of claim 28, wherein the poly(alkylene glycol) is poly(ethylene glycol).

30. The article of claim 28, wherein component B (iv) is selected from diethylene glycol and triethylene glycol.

31. The article of claim 30, wherein the polyester in said outer composition has a $T_m$ of less than 150° C.

32. The article of claim 30, wherein the polyester in said outer composition has a $T_m$ of 100° to 130° C.

33. An article of manufacture comprising:

(A) 50 to 99.95% by weight of a core portion comprising a substantially amorphous water-dispersible sulfopolyester having a Tg of less than 25° C., comprising the reaction product of (i) at least one aliphatic, cycloaliphatic, or aromatic dicarboxylic acid or its $C_1$–$C_4$ ester, provided that said acid is devoid of additional pendant polar functionality;

(ii) 2-30 mole %, based on the total moles of acid and glycol, of at least one difunctional sulfomonomer selected from the group consisting of a dicarboxylic acid or $C_1$–$C_4$ ester thereof containing a metal sulfonate group bonded directly to an aromatic ring or a glycol containing a metal sulfonate group bonded directly to an aromatic ring;

(iii) at least one glycol, wherein said glycol is selected from the group consisting of aliphatic glycols having 3 to 20 carbon atoms, aromatic glycols having 8 to 24 carbon atoms and mixtures thereof;

(iv) 0 to 100 mole %, based on total moles of glycol, of a poly(alkylene glycol) having the structure

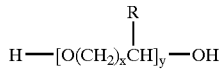

wherein R is H, $C_1$–$C_6$ alkyl, or halogen, x is an integer of from 1 to 6, y is an integer of from 2 to 500;

(v) 0 to 40 mole %, based on the total moles of acid and glycol, of a multifunctional reactant containing at least three functional groups selected from acid, ester, hydroxyl, or mixtures thereof;

wherein the polyester core is prepared from substantially equal molar proportions of acid or ester (100 mole %) and glycol equivalents (100 mole %);

(B) wherein the surface of the core is sufficiently covered to prevent blocking when in contact with adjacent cores by 0.05 to less than 50% by weight of an outer composition comprising a polyester having a Tg of greater than 25° C. and/or a Tm of greater than 25° C. and less than 230° C., provided that said polyester is other than poly(butylene terephthalate), comprising the reaction product of:

(i) at least one aliphatic, cycloaliphatic, or aromatic dicarboxylic acid or its $C_1$–$C_4$ ester, provided that said acid is devoid of additional pendant polar functionality;

(ii) 0 to 25 mole %, based on the total moles of acid, of at least one aliphatic, cycloaliphatic, or aromatic dicarboxylic acid or its corresponding $C_1$–$C_4$ ester wherein said acid contains at least one polar functional group or ionic group;

(iii) at least one glycol, wherein said glycol is selected from the group consisting of aliphatic glycols having 3 to 20 carbon atoms, cycloaliphatic glycols having 6 to 20 carbon atoms, aromatic glycols having 8 to 24 atoms and mixtures thereof;

(iv) 0 to 80 mole %, based on the total moles of glycol of a poly(alkylene glycol) having the structure

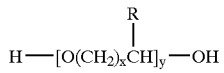

wherein R is H, $C_1$–$C_6$ alkyl, or halogen, x is an integer from 1 to 6, y is an integer of from 2 to 500;

(v) 0 to 5 mole %, based on the total moles of acid and glycol, of a multifunctional reactant containing at least three functional groups selected from acid, ester, hydroxyl, or mixtures thereof;

wherein said polyester is prepared from substantially equal molar proportions of acid or ester (100 mole %) and glycol equivalents (100 mole %); and wherein at least a portion of the polyester core and outer polyester undergo an exchange reaction at a temperature of from about 100° C. to 300° C., and wherein observed Tg's of said core and outer composition tend to coalesce into an essentially unitary Tg over time at said temperature.

34. The article of claim 33, wherein the Tg of the water-dispersible sulfopolyester is −50 to 20° C.

35. The article of claim 33, wherein the Tg of the water-dispersible sulfopolyester is −350 to 15° C.

36. The article of claim 33, wherein component A (ii) is utilized in an amount of from 2.5 to 25 mole %, based on the total moles of acid and glycol.

37. The article of claim 33, wherein component A (ii) is a metal salt of 5-sulfoisophthalic acid.

38. The article of claim 33, wherein component A (iv) is utilized in an amount of from 20 to 100 mole %, based on the total moles of glycol.

39. The article of claim 38, wherein the poly(alkylene glycol) is poly(ethylene glycol).

40. The article of claim 33, wherein component A (iv) is selected from diethylene glycol and triethylene glycol.

41. The article of claim 33, wherein component B (ii) is utilized in an amount of from 0 to 10 mole %, based on the total moles of acid.

42. The article of claim 33, wherein component B (iv) is utilized in an amount of from 10 to 70, based on the total moles of glycol.

43. The article of claim 42, wherein the poly(alkylene glycol) is poly(ethylene glycol).

44. The article of claim 42, wherein the poly(alkylene glycol) is selected from diethylene glycol and triethylene glycol.

45. The article of claim 44, wherein the polyester in said outer composition has a $T_m$ of 100° to 130° C.

46. The article of claim 33, wherein the substantially amorphous water-dispersible sulfopolyester has a $T_g$ of about −50° to 20° C.

47. The article of claim 33, wherein said article is in the form of a pellet, a pastille, or a block.

* * * * *

UNITED STATES PATENT AND TRADEMARK OFFICE
CERTIFICATE OF CORRECTION

PATENT NO. : 6,706,399 B1
DATED : March 16, 2004
INVENTOR(S) : George et al.

It is certified that error appears in the above-identified patent and that said Letters Patent is hereby corrected as shown below:

Column 15,
Line 17, "$3 \times 10_{-3}$" should be -- $3 \times 10^{-3}$ --

Column 19,
Line 13, "-350" should be -- -35 --

Signed and Sealed this

Seventeenth Day of August, 2004

JON W. DUDAS
*Acting Director of the United States Patent and Trademark Office*